United States Patent [19]

Kapany et al.

[11] Patent Number: 5,191,467
[45] Date of Patent: Mar. 2, 1993

[54] FIBER OPTIC ISOLATER AND AMPLIFIER

[75] Inventors: Narinder S. Kapany, Woodside; Fred C. Unterleitner, Palo Alto; Shin-Lo Chia, San Jose, all of Calif.

[73] Assignee: Kaptron, Inc., Palo Alto, Calif.

[21] Appl. No.: 862,045

[22] Filed: Apr. 2, 1992

Related U.S. Application Data

[63] Continuation-in-part of Ser. No. 735,145, Jul. 24, 1991, abandoned.

[51] Int. Cl.$^5$ .......................... H01S 3/30; G02B 6/26; H04J 11/00
[52] U.S. Cl. ..................................... 359/341; 385/47; 385/11; 359/122; 359/156; 359/345; 372/6
[58] Field of Search ............... 359/122, 156, 341, 340; 385/11, 47; 372/6

[56]  References Cited

PUBLICATIONS

Chang et al, Hewlett-Packard J., vol. 42, #1, pp. 45-50; Feb. 1991.

*Primary Examiner*—Nelson Moskowitz
*Attorney, Agent, or Firm*—Townsend and Townsend

[57] ABSTRACT

A fiber optic isolator uses only one-half the amount of costly rotator material as the prior art and an isolated laser amplifier uses only one-quarter the amount of costly rotator material. An embodiment of a fiber optic isolator includes a concave reflector and a fiber holder defining first and second fiber ports that register the respective ends of first and second fibers. A polarizer is located between the first port and the reflector, an analyzer is located between the second port and the reflector, and a Faraday rotator is disposed between the polarizer and analyzer on one side and the reflector on the other side. The polarizer and analyzer have their polarization axes at a relative angle of 45° while the rotator is configured to provide a 22.5° rotation. The port locations, the reflector, the polarizer, and the analyzer are configured so that light diverging from the end of the first fiber and entering the first port passes through the system and is imaged at the end of the second fiber, at least for one polarization component. At the same time, light that enters the second port is prevented from leaving the first port, regardless of the polarization mode.

25 Claims, 4 Drawing Sheets

FIBER OPTIC ISOLATER AND AMPLIFIER

This application is a continuation-in-part of Ser. No. 07/735145 filed Jul. 24, 1991 and now abandoned.

BACKGROUND OF THE INVENTION

The present relates generally to fiber optic devices, and more specifically to isolators and amplifiers suitable for use in a fiber optic communication system.

U.S. Pat. Nos. 4,329,017 and 4,479,697 to Kapany et al. disclose a number of fiber optic communication devices for performing a wide variety of monitoring, splitting, switching, and multiplexing functions. The devices are based on the property of a spherical reflecting surface that a point source of light slightly displaced from the center of curvature is imaged with minimal aberration at an optically conjugate point symmetrically located with respect to the center of curvature. The disclosures of the '017 and '697 patents are incorporated by reference.

U.S. Pat. No. 5,028,104 to Kokoshvili discloses a bypass switch suitable for use in a fiber optic LAN ring structure. The switch features a node self-test channel which is implemented by use of a looped fiber. Developments in recent years have presented the need for fiber optic isolators in local area networks. In brief, an isolator is like a check valve that lets light propagate in a downstream direction, but not in an upstream direction. It is sometimes very important that any light reflected from fiber connectors or other devices not be allowed to propagate in the reverse direction where such light might be mistaken for a signal or might interfere with other signals. Indeed, if a laser amplifier in the LAN were to be subjected to stray reflected light, it could become an oscillator, with potentially disastrous results.

Prior art fiber optic isolators typically collimate the light emerging from the upstream fiber's end, pass the light through a polarizer, a 45° Faraday rotator, and an analyzer having its axis at a 45° to the axis of the polarizer, and focus the light onto the downstream fiber's end. Clearly, the light emerging from the upstream fiber's end passes through the polarizer, is rotated by an amount that corresponds to the analyzer axis, and thus passes through the analyzer. Conversely, reflected light emerging from the downstream fiber's end passes through the analyzer, is rotated by the rotator, and blocked (attenuated) by the polarizer. A prior art isolated laser amplifier includes an upstream isolator as described above, a multiplexer which combines the signal radiation with pump radiation, a length of doped fiber in which the signal is amplified, and a downstream isolator.

A typical implementation of the Faraday rotator in these devices is a yttrium iron garnet (YIG) crystal surrounded by a solenoid. Typically the solenoid is energized to provide sufficient magnetic field to saturate the crystal, and the crystal thickness is selected to provide 45° rotation. Unfortunately, the YIG crystals that are used for the isolators are expensive.

SUMMARY OF THE INVENTION

The present invention provides a fiber optic isolator that uses only one-half the amount of costly rotator material as the prior art and an isolated laser amplifier that uses only one-quarter the amount of costly rotator material.

A first embodiment of a fiber optic isolator according to the present invention includes a polarizer, an analyzer, a Faraday rotator, a reflecting imaging device, which includes a reflector, and a fiber holder defining first and second fiber ports that register the respective ends of first and second fibers. The reflecting imaging device may include a concave reflector that performs the imaging, or a graded index (GRIN) lens and a plane reflector, or a variant on the above. The polarizer is located between the first port and the reflector, the analyzer is located between the second port and the reflector, and the Faraday rotator is disposed between the polarizer and analyzer on one side and the reflector on the other side. The polarizer and analyzer have their polarization axes at a relative angle of 45° while the rotator is configured to provide a 22.5° rotation.

The port locations, the reflecting imaging device, the polarizer, and the analyzer are configured so that light diverging from the end of the first fiber and entering the first port passes through the system and is imaged at the end of the second fiber, at least for one polarization component. At the same time, light that enters the second port is prevented from leaving the first port, regardless of the polarization mode. The particular manner in which this is accomplished depends on the specifics of the polarizer and analyzer, but the overall operation of this and other embodiments can be described at a high level in terms of a polarizer and analyzer that pass light that is polarized in a given polarization plane and block light that is polarized in a perpendicular polarization plane.

Light diverging from the end of the first fiber enters the first port and encounters the polarizer. The light that passes through the polarizer passes through the rotator (which rotates its polarization plane by 22.5°), is reflected and rendered convergent by the reflector, and again passes through the rotator (which rotates its polarization plane an additional 22.5°), whereupon it passes through the analyzer and leaves the second port, having been imaged on the end of the second fiber. Conversely, light that might enter the second port and pass through the analyzer follows the reverse path through the rotator to the reflector and back to the first port, and reaches the polarizer with its plane of polarization at 90° to the polarizer. Thus, any such light reaching the polarizer is greatly attenuated before leaving the first port.

A second embodiment of the isolator provides two stages of attenuation of light traveling in the upstream direction. This embodiment of the isolator includes four ports, the first and second being optically conjugate with respect to the reflecting imaging device and the third and fourth being optically conjugate. A polarizer is located between the first and third ports on one side and the reflector on the other side while an analyzer is located between the second and fourth ports on one side and the reflector on the other side. Again the polarizer and analyzer have their axes at 45° to one another. A 22.5° rotator is disposed between the polarizer and analyzer on one side and the reflector on the other side. A mechanism such as a length of fiber couples light between the second and third ports.

Accordingly, light entering the first port leaves the second port, enters the third port, and leaves the fourth port with the rotation of polarization being such to allow passage. Conversely, light entering the fourth port is blocked by the polarizer and largely prevented from leaving the third port. If a small amount of this light enters the second port, it is prevented by the polarizer from leaving the first port.

An isolated amplifier according to the present invention includes the elements of the second isolator embodiment as well as a multiplexing function to couple pump radiation through a fifth port into a doped fiber loop that couples the second and third ports. The multiplexing is accomplished by providing a second reflecting imaging device having a reflector that is reflective to the pump radiation and disposed such that the second and fifth ports are optically conjugate with respect to the second reflecting imaging device. If the second reflector is behind the first reflector, the first reflector must be reflective to the signal radiation and transmissive to the shorter wavelength pump radiation. If the second reflector in front of the first, it must be reflective to the pump radiation and transmissive to the signal radiation.

The polarizer and analyzer can cooperate in a somewhat different way to provide the same overall operation. For example, each can be constructed of an optically active material that transmits all polarizations, but laterally separates the ordinary and extraordinary ray components. In such a case, one component diverging from the end of the first fiber is imaged on the end of the second fiber while the other component is imaged at a different location and therefore doesn't enter the second fiber. Both components of any light diverging from the second fiber are imaged at locations away from the end of the first fiber and therefore don't enter the first fiber.

The embodiments of the isolator and amplifier, as described above, thus operate to pass light of a single known polarization in the forward direction and block all light in the backward direction. According to a further aspect of the invention, light of arbitrary polarization that enters the entrance port is passed through the isolator (or is amplified by the amplifier) and leaves the exit port, while light of any polarization entering the exit port is prevented from leaving the entrance port. According to this aspect of the invention, the polarizer comprises a plate of a birefringent material (such as calcite) and the analyzer comprises a pair of plates of such material. The plates are all cut with their faces at an angle to the optic axis. The analyzer plates have their projected optic axes at 90° to each other and at 45° to the projected optic axis of the polarizer plate. With this configuration, and suitable plate thicknesses, the ordinary and extraordinary rays, which are separated by the polarizer, are brought together by the analyzer for light traveling downstream.

A further understanding of the nature and advantages of the present invention may be realized by reference to the remaining portions of the specification and the attached drawings.

DESCRIPTION OF THE SPECIFIC EMBODIMENT(S)

Prior Art Isolator and Amplifier

Figure 1:
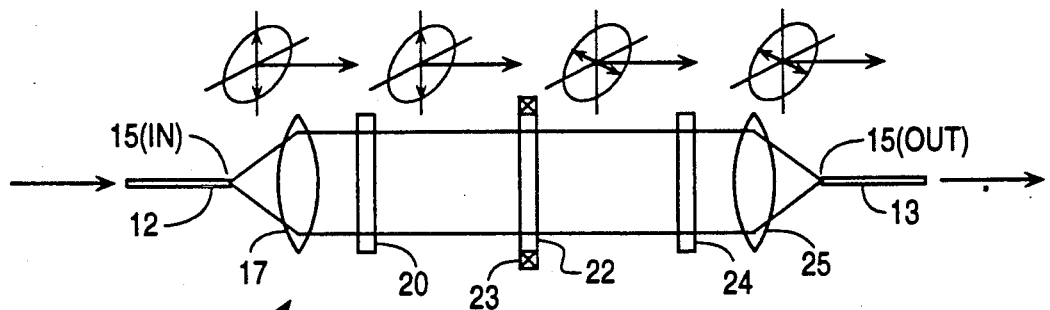
FIG. 1 is an optical schematic of a prior art fiber optic isolator.

FIG. 1 is an optical schematic of a prior art fiber optic isolator 10, which provides one-way isolation between an input fiber 12 and an output fiber 13. Viewed at its highest level of functionality, the isolator can be considered as having an input port 15(in) and an output port 15(out), and operating to allow signal light entering port 15(in) to leave port 15(out) but to prevent light (such as reflected light) entering port 15(out) from leaving port 15(in).

As a matter of definition, the term "downstream" or "forward" refers to the direction from fiber 12 to fiber 13, "upstream" or "reverse" to the direction from fiber 13 to fiber 12. These definitions are functional, not spatial. In the present invention, light undergoes reflection, but the term "forward," for example, still applies to light traveling from the input fiber to the output fiber, even though the light changes direction when it is reflected.

Further, the term "light" refers to any electromagnetic radiation in a wavelength band suitable for optical fiber communication. A wavelength of about 1300-1500 nm is typical for single-mode fiber. Reference will sometimes be made to "one" or "a given" linear polarization component and to the "other" linear polarization component. In this context, the "other" component is usually understood to be perpendicular to the first-mentioned component.

Light, which is assumed to be linearly polarized in the plane of the figure, emerges from the end of fiber 12, enters port 15(in), is collimated by a lens 17, and passes through a polarizer 20 whose axis is in the plane of the figure. The light passing through the polarizer encounters a Faraday rotator 22 (with associated magnet 23), which operates to rotate the plane of polarization by 45°. The light then encounters an analyzer 24 whose axis is aligned at 45° to the plane of the figure. The light passes through the analyzer and is focused by a lens 25 on the end of fiber 13.

Consider now the light propagating upstream in fiber 13. This light emerges from the end of fiber 13, enters port 15(out), is collimated by lens 25, and encounters analyzer 23. Depending on the polarization of the light, the component having its plane of polarization at 45° to the plane of the figure passes through the analyzer, has its plane of polarization rotated an additional 45° away from the plane of the figure, and encounters the polarizer. Since the light's plane of polarization is 90° to the axis of the polarizer, the light is prevented from leaving port 15(in) and entering fiber 12.

As a practical matter, analyzers and polarizers are never perfect. Therefore a small fraction of the light traveling downstream may be blocked, or a small fraction of the light traveling upstream may not. Furthermore, light traveling between the polarizer and analyzer may be scattered into other polarization modes and thus not behave in the ideal way. Therefore, a reference to light passing through an element should be understood to include the possibility of slight loss, and a reference to light being blocked by an element should be understood to include the possibility of slight leakage.

Figure 2:
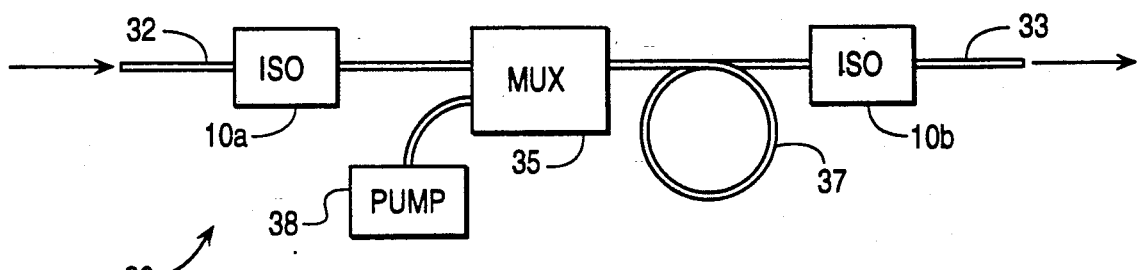
FIG. 2 is an optical schematic of a prior art fiber optic amplifier.

FIG. 2 is an optical schematic of a prior art fiber optic laser amplifier 30 including isolation. Amplifier 30 receives a light signal traveling downstream in an input fiber 32, amplifies the light signal, and transmits the amplified signal downstream into an output fiber 33. The actual amplification section is bounded by upstream and downstream isolators 10a and 10b, which may be of the sort illustrated in FIG. 1. Signal light propagating downstream through isolator 10a enters a first input port of a multiplexer 35 and is directed to an active fiber 37. Light at a shorter wavelength from a pump source 38 enters a second input port of multiplexer 35 and is also directed into fiber 37.

The active fiber, which may be 5–10 meters long, is doped with a rare earth element (say erbium) which has suitable metastable excited states to provide stimulated emission gain in a wavelength band that includes the signal light. The population of the metastable states is raised to desired values by pump laser 38. The isolators are needed at both ends of the fiber amplifier to avoid possible oscillation due to reflections at the input and output fibers. In some designs, the active fiber is pumped from both ends to achieve more uniform population inversion and higher gain. This would require multiplexers at both ends of the active fiber.

Device Overview

The basic embodiments of the invention include two types of fiber optic isolator (single stage of attenuation and two stages of attenuation) and a fiber optic laser amplifier. Each basic embodiment, is subject to a number of implementation and construction variations.

All the embodiments rely on light emerging from the end of one fiber being imaged into the end of another fiber. As a matter of definition, two points are said to be optically conjugate with respect to an imaging device if light emerging from the first point is imaged at the second point. The relationship must also take into account the nature of the optical path between the points. For example, if the path does not include optically active materials, two points that are conjugate for the forward direction will be conjugate for the reverse direction. The nature of the present invention, however, is to allow light to propagate one way and not the other, and optically active materials are used to prevent two points, conjugate in the downstream direction, from being conjugate in the upstream direction.

As a matter of further definition, a reflecting imaging device will be taken to mean an imaging device where light emerging from the first point undergoes at least one reflection before it is imaged at the second point. One type of reflecting imaging device, used in a number of embodiments, includes a concave reflecting surface that provides most or all of the optical power. Another type includes a refractive element that provides most or all of the optical power and a reflecting surface that provide little or no optical power. The initial description will assume the use of a concave reflector as the imaging device.

Further, all the embodiments rely on polarization phenomena to provide optical isolation. One type of operation that can be achieved is that only a particular polarization component can propagate downstream while a second type of operation allows all polarizations to propagate downstream. In both types of operation, light of all polarizations is prevented from propagating upstream. The operation depends on the use of what are broadly referred to as a polarizer and an analyzer. The initial description will assume that the polarizer and analyzer are simple devices that pass light of one polarization and block light on the other. It is to be understood, however, that the preferred implementations of the polarizer and analyzer include birefringent materials that actually pass both polarization components, but deflect one relative to the other. This will be described in detail below.

Basic Embodiments of the Invention

Figure 3:
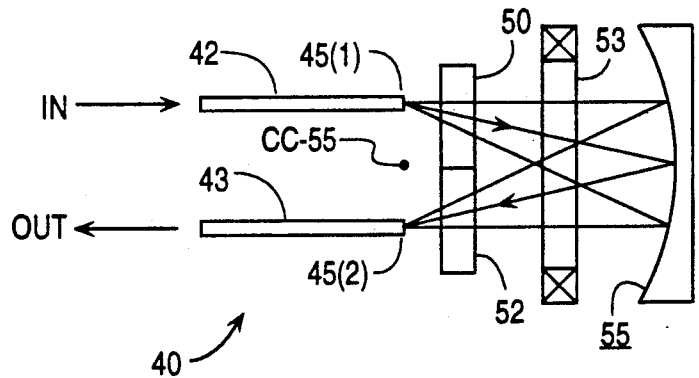
FIG. 3 is an optical schematic of a first embodiment of an isolator according to the present invention.

FIG. 3 is an optical schematic (side view) of a first embodiment of an isolator 40 according to the present invention. The isolator is a two-port device that allows downstream light in an input fiber 42 to pass into an output fiber 43, but prevents light traveling upstream in fiber 43 from passing into fiber 42. The ends of the fibers are registered at first and second fiber ports 45(1) and 45(2). The isolator includes a polarizer 50, an analyzer 52, a Faraday rotator 53 (with an associated ring magnet), and a reflecting imaging device comprising a concave reflector 55. Polarizer 50 is located in the path of light that has entered port 45(1) while analyzer 52 is located in the path of light that is about to leave port 45(2). The polarizer and analyzer have their axes at 45° to one another. Rotator 53 is of a thickness to provide 22.5° rotation. The fiber ports are located so that the ends of fibers 42 and 43 are at optically conjugate locations with respect to reflector 55.

In a preferred embodiment, reflector 55 is a spherical mirror. A spherical surface has the property that within a medium of uniform refractive index, points symmetrically disposed and near the center of curvature are optically conjugate. Accordingly, reflector 55 is shown with its center of curvature CC-55 located halfway between the ends of the fibers. As will be described below, in some embodiments, the center of curvature is displaced laterally from midway between the fibers to account for or exploit the effect of optically active materials. Since the optical path between the fibers and reflector is nearly of a uniform index (the polarizer, analyzer, and rotator are relatively thin), the center of curvature is still longitudinally near the ends of the fibers.

The drawing is highly stylized in a number of regards. First, the fiber ends are shown as parallel and at a large distance from each other. In the actual device, the fibers are as close together as is practical, and possibly at a small angle to each other. Second, the rays are shown as passing through the elements in a straight line (no refractive effect). In the actual device, there is some refraction at some interfaces. Third, the drawing shows airspaced elements. In most actual implementations of the device, the construction does not include airspaces.

Light entering port 45(1) and passing through polarizer 50 has its plane of polarization rotated 22.5°, is reflected from reflector 55, passes again through the rotator where its plane of polarization is rotated another 22.5°, passes through the analyzer, and leaves through port 45(2). It is noted that in contrast to the prior art, which requires a Faraday rotator capable of imparting 45° of rotation, the present invention uses a 22.5° rotator, which need be only half as thick. The insensitivity of Faraday rotation to the direction of propagation makes it possible to use such a reflective coupler with only half the amount of expensive rotator material. The stray light from reflections that enters port 45(2) and passes through analyzer 52 has its plane of polarization rotated by 45° and therefore encounters the polarizer with its plane of polarization at 90° to the polarizer axis and is thereby attenuated, and substantially prevented from leaving port 45(1) and entering fiber 42.

The fact that light passing through the YIG crystal is in a diverging or converging beam should not significantly impair the overall isolation. The interaction path length increases as the reciprocal of the cosine of the ray angle relative to the magnetic field, while the Faraday rotation decreases as the cosine of the angle. Thus, the effects cancel, especially for the small angles involved in single-mode fiber devices.

Figure 4:
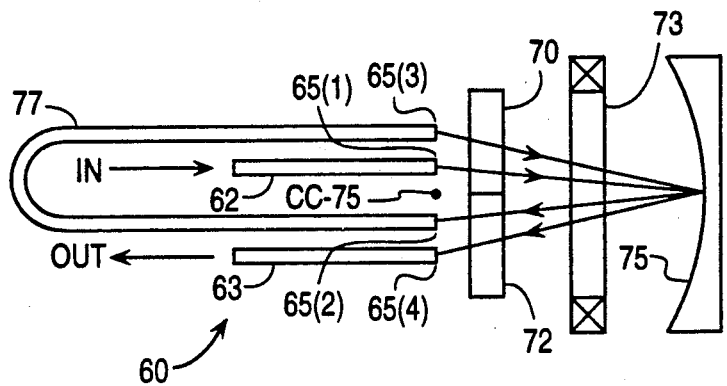
FIG. 4 is an optical schematic of a second embodiment of an isolator according to the present invention.

FIG. 4 is an optical schematic (side view) of a second embodiment of an isolator 60 according to the present invention. Only the central ray of the diverging and converging cones are shown. This embodiment provides two levels of attenuation by having light pass through the device twice. As above, the isolator is interposed between an input fiber 62 and an output fiber 63. The device includes a polarizer 70, an analyzer 72, a 22.5° rotator 73, and a concave reflector 75 with center of curvature CC-75.

The isolator has first, second, third, and fourth fiber ports 65(1), 65(2), 65(3), and 65(4), the first and second being optically conjugate (i.e., equidistant from CC-75) and the third and fourth being optically conjugate. The fiber ends are preferably disposed along a line perpendicular to the fiber axes, but this is not necessary.

Light entering or leaving the first or third ports passes through polarizer 70 while light entering or leaving the second or fourth ports must pass through analyzer 72. A fiber loop 77 or other mechanism couples the second and third ports. Port 65(1) is the input port and port 65(4) is the output port so that light entering port 65(1) leaves port 65(2) and is coupled into port 65(3) wherein it leaves port 65(4), always aligned properly with respect to the analyzer and polarizer whereas light entering port 65(4) encounters the polarizer at 90° and is attenuated. Any small amount leaving port 65(3) is coupled into port 65(2), and encounters the polarizer at 90° and is further attenuated, being in effect prevented from leaving port 65(1).

Figure 5:
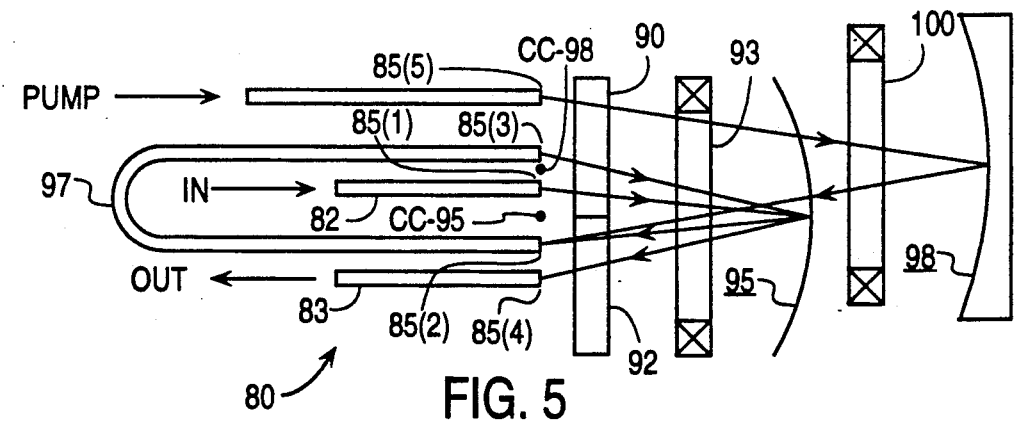
FIG. 5 is an optical schematic of an amplifier according to the present invention.

FIG. 5 is an optical schematic (side view) of an isolated amplifier 80 according to the present invention. Only the central ray of the diverging and converging cones are shown. Amplifier 80 operates to receive signal light traveling downstream from an input fiber 82 and amplify such light, and cause it to pass downstream in an output fiber 83. The amplifier resembles isolator 60 of FIG. 4 except that it includes an additional fiber port and reflector to provide a multiplexer for combining the signal radiation with pump radiation. Specifically, the amplifier includes first, second, third, fourth, and fifth fiber ports 85(1), 85(2), 85(3), 85(4), and 85(5), a polarizer 90, an analyzer 92, a 22.5° rotator 93, a first reflector 95 with center of curvature CC-95, a fiber loop 97, and a second reflector 98 with center of curvature CC-98. As in the case of the isolator, ports 85(1) and 85(2) are optically conjugate with respect to reflector 75, as are ports 85(3) and 85(4). Port 85(5) and port 85(2) are optically conjugate with respect to reflector 98.

Reflector 95 is reflective at the wavelength that characterizes the signal radiation while reflector 98 is reflective at the shorter wavelength that characterizes the pump radiation. In this particular illustrated embodiment, reflector 98 is behind reflector 95, and therefore reflector 95 must be transmissive to the light at the pump wavelength. In the event that the order of reflectors were reversed, reflector 98 would have to be transmissive to light at the signal wavelength. While fiber 77 in isolator 60 merely operated to couple light from the second to the third port, fiber 97 in amplifier 80 is an active doped fiber that provides spontaneous emission gain in the wavelength range that includes the signal wavelength. This active fiber is typically significantly longer than the coupling fiber in the isolator. Amplifier 80 may be provided with a second Faraday rotator 100 that compensates for the fact that rotator 93, which is set to provide 22.5° of rotation for the signal radiation is likely to provide a slightly different amount of rotation for the pump radiation. A mismatch in polarization angle would result in some loss of the pump radiation at the analyzer.

Construction Using Slanted Interface

Figure 6A:
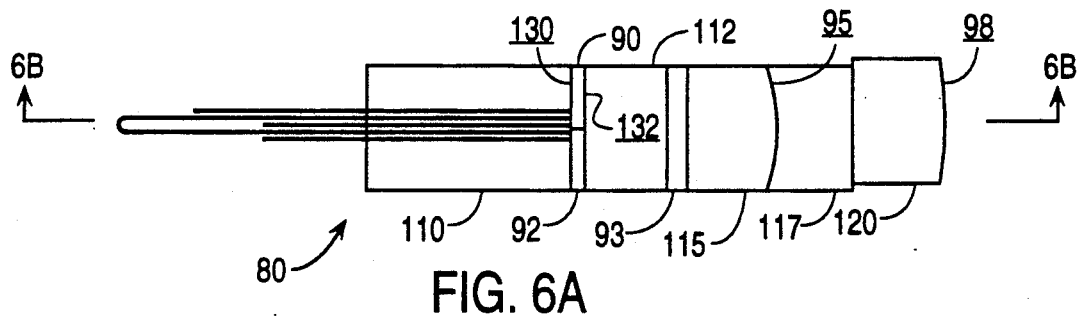
FIGS. 6A and 6B are top and side sectional views of the amplifier, showing a slanted fiber holder for use with the present invention.
Figure 6B:
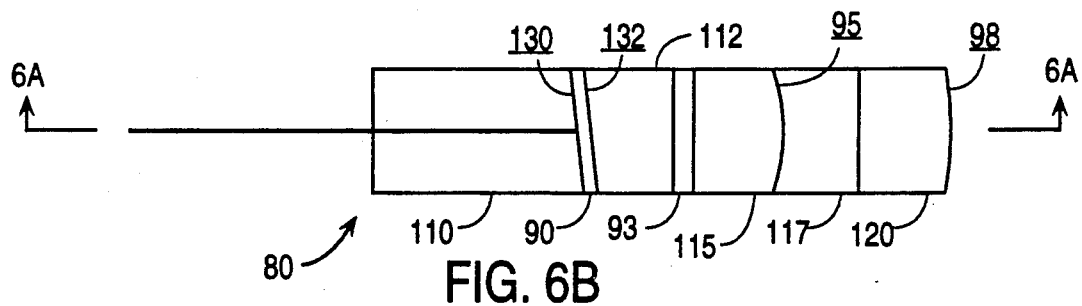

FIGS. 6A and 6B are side and top sectional views of amplifier 80, illustrating the preferred construction and further illustrating the use of a fiber holder 110 with a slanted interface for eliminating back reflections. The schematic views of FIGS. 3–5 show what appear to be airspaced embodiments. The preferred construction for the isolators and the amplifiers is, however, solid glass (except for the optically active components). The drawing is generally to scale with the transverse dimension being about 3 mm.

The amplifier is of solid cemented construction including, in order, fiber holder 110, polarizer 90 and analyzer 92, a spacer 112, rotator 93, a plano-convex element 115 whose coated convex surface defines reflector 95, a plano-concave spacer 117, and a plano-convex element 120 whose coated convex surface defines reflector 98. The elements other than the polarizer, analyzer, and rotator are glass. Given the definition of top and side, the five fiber ends are disposed along a vertical line, and the end portions of the fibers lie in a vertical plane. A 2-port or 4-port isolator would have the same construction as the amplifier except that there would be no need for spacer 117 and plano-convex element 120.

As can be seen from the top sectional view, fiber holder 110 has an end face 130 which lies in a vertical plane, but is not perpendicular to the vertical plane of the fibers.

Rather, it is at an angle of about 84° to that plane. The .6° slant operates so that the component of the light emerging from one of the fibers that is reflected at the interface is reflected at an angle that is outside the cone of acceptance of the fiber. The polarizer and analyzer are cemented to end face 130, and spacer 112 is formed with a complementarily slanted surface 132. Using standard index matching optical cement and good polish quality on the fiber holder and polarizer/analyzer surfaces, back reflection should be less than −60 db. Spacer 112 separates the polarizing elements from the Faraday rotation crystal.

The YIG crystal has a relatively high refractive index, and is preferably coated with an anti-reflection (AR) coating to match the optical cement index at the center of the amplifier band (about 1540 nm). The combination of AR coating and the divergence of the reflected light from the plane interface can reduce the back reflection from the YIG interfaces below −70 db.

In the amplifier embodiment, it may be desirable to provide an air space at the fiber interface, since high power pump lasers may result in sufficient power density at the fiber core to damage the cement. In such a case, the fiber holder and the facing surfaces of the polarizer and analyzer should carry an AR coating. The added aberration due to plane interfaces of unmatched refractive index is only a fraction of a micron, which is negligible compared to the 5μ mode field radius.

Construction Using GRIN Lens

Figure 7A:
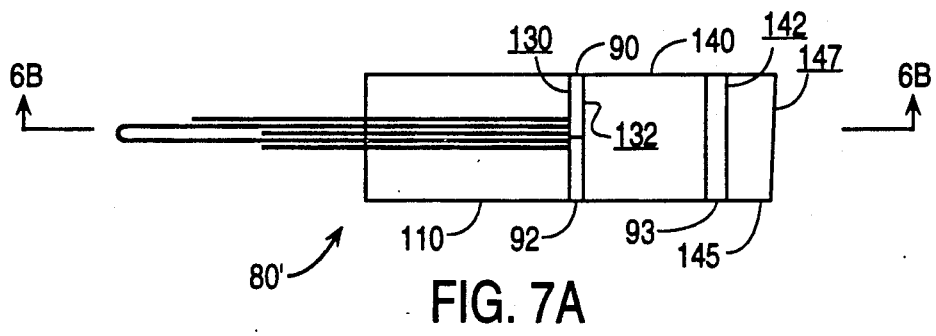
FIGS. 7A and 7B are top and side sectional views of an amplifier construction using a GRIN lens.
Figure 7B:
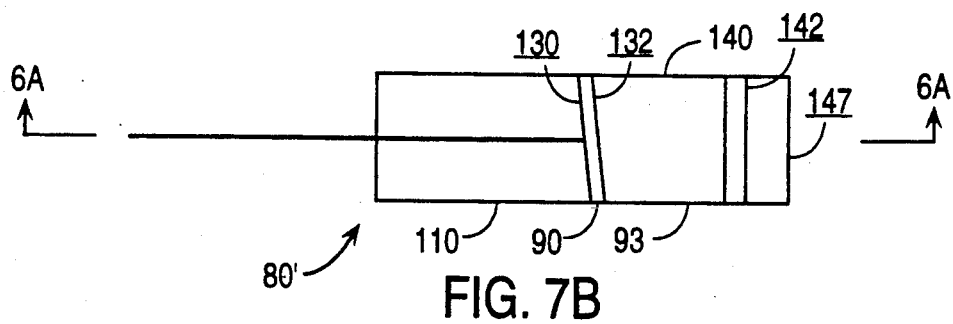

FIGS. 7A and 7B are side and top sectional views of an amplifier, designated 80', illustrating a construction where the imaging element uses a graded index (GRIN) lens 140 rather than concave reflectors. In this case, the amplifier also includes fiber holder 110, polarizer 90, analyzer 92, and rotator 93 as in the case of the embodiment illustrated in FIGS. 6A and 6B. GRIN lens 140 is located between the polarizer and analyzer on one side, and rotator 93 on the other side. Rotator 93 is coated on its downstream side with material that is reflective to the signal radiation and transmissive to the pump radiation so as to define a plane reflector 142. The amplifier further includes a small-angle wedge 145 downstream of the reflectively coated rotator. The downstream surface of the wedge is coated with material that is reflective to the signal radiation so as to define a plane reflector 147.

The operation of the device and the particular geometric relationships can be best understood in view of the following short discussion on the properties of GRIN lenses. A GRIN lens is characterized by a cycle or pitch. A one-cycle GRIN lens operates to image an on-axis point source at one end of the lens to an on-axis point at the other end of the lens. In between, the light is collimated, refocused on the axis at the lens midpoint, collimated again, and refocused again at the other end so that each ray emerges in its original direction. Thus a one-cycle GRIN lens is afocal and operates as a relay. However, if the lens is only 0.25-pitch, an on-axis point source of light at one end will emerge from the other end collimated and in a direction parallel to the axis. An off-axis point source at one end will emerge collimated, but in a direction inclined from the axis by an angle that depends on the distance of the source from the axis (relative to the pitch of the lens).

In amplifier 80', the fiber ends are at five port locations corresponding to ports 85(1-5) in FIG. 5, and ports 85(1-4) are symmetrically disposed relative to the GRIN lens axis in the same relation as they are to center of curvature CC-95 in the concave reflector embodiment. If the fiber ends were directly against the GRIN lens, the GRIN lens would be a 0.25-pitch device and the light emerging from one of the input fibers would be collimated and at a small angle to the axis when it encountered rotator 93 and reflector 142. Since the polarizer and analyzer are between the fiber ends, the GRIN lens is somewhat less than 0.25-pitch to achieve the same result, namely that of having the light emerging from the input fiber encounter rotator 93 and reflector 142 in a collimated state.

Since port 85(1) is off-axis, the light emerging from the fiber end is collimated and encounters reflector 142 at a slight angle from the normal. It is then reflected back at the opposite small angle and reimaged by the GRIN lens at port 85(2). Thus the GRIN lens and reflector 142 cooperate to define a first reflective imaging element for the signal radiation. Similarly, the light emerging from port 85(3) is imaged on port 85(4). This is because those ports are located symmetrically about the axis of the GRIN lens and reflective surface 142 is perpendicular to that axis. However, in order that port 85(2) be conjugate with respect to port 85(5) for light of the pump wavelength, reflector 147 must be at a slight angle to the GRIN lens axis. Thus, the GRIN lens and reflector 147 define a second reflective imaging element for the pump radiation. A 2-port or 4-port isolator would have the same construction as the amplifier except that there would be no need for the wedge.

Polarizer and Analyzer

The description above was in terms of basic polarizers that pass one polarization and block the other. While there are materials that actually transmit one polarization and absorb the other, the preferred embodiments use a birefringent material, cut with its optic axis at an angle to the direction of propagation. Such materials pass one polarization component (the ordinary ray) but deflect the other component (the extraordinary ray). By suitable arrangement of the elements, it is possible to reject one of the components. The use of materials that deflect the extraordinary ray rather than absorb it is advantageous since the polarizing elements are thin, and an absorbing element could be prone to damage.

Figure 8A:
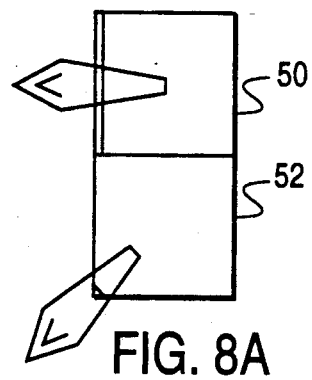
FIG. 8A is a plan view of a polarization dependent polarizer and analyzer for use with the present invention.

FIG. 8A shows, by way of example, polarizer 50 and analyzer 52. In these embodiments, the polarizer and analyzer are plates of calcite (approximately 2 mm×2 mm), cut with the polished faces at about 45° to the optic axis, and about 0.50 mm thick. The optical axis is denoted by a stylized arrow, drawn to appear that it is coming out of the plane of the drawing. This results in a displacement of the extraordinary ray image by about 25 microns relative to the ordinary ray image, thus providing at least −50 db of extinction with standard single-mode fiber and good quality calcite. As can be seen, the projection of the optic axis of the analyzer is at 45° relative to the projection of the optic axis of the polarizer.

For light of arbitrary polarization passing through a birefringent crystal, the ordinary ray passes through the crystal in a straight line (subject to normal refraction according to Snell's law) while the extraordinary ray, which does not obey Snell's law is displaced laterally relative to the ordinary ray. Thus, the extraordinary component appears to be coming from a location that is laterally displaced. Put another way, the extraordinary component appears to be emanating from a fiber core that is displaced from the actual fiber core location by a distance d along the projection of the optic axis.

Figure 8B:
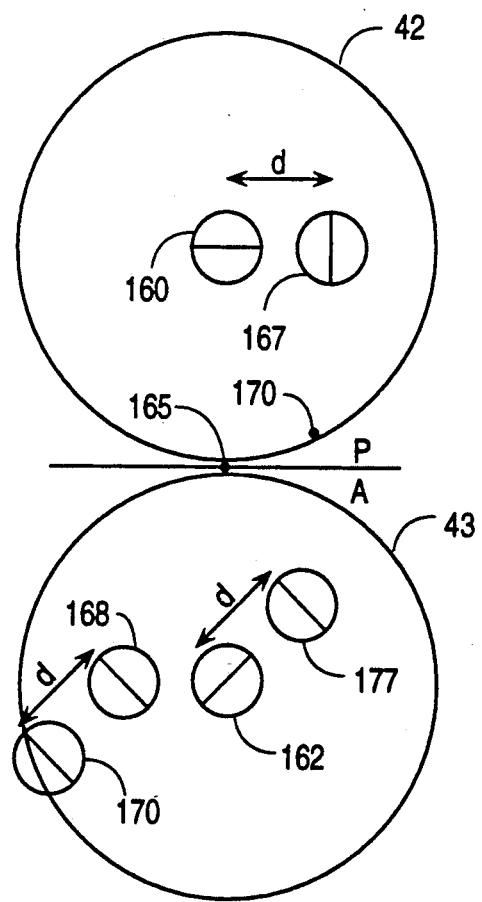
FIG. 8B shows the operation of the polarizer and analyzer of FIG. 8A.

FIG. 8B is a schematic end view (looking toward the fiber ends from the reflector) illustrating the operation of polarizer 50 and analyzer 52 in a polarization dependent device. The figure shows, by way of example, input and output fibers 42 and 43 of FIG. 3, with respective fiber cores 160 and 162 shown at the centers of the fibers. With the center of curvature of the reflector located midway between the two fiber cores at a position 165, the ordinary ray emerging from the fiber and passing through the polarizer is imaged on the output fiber. However, the extraordinary ray, which appears as a displaced virtual image 167, is imaged on the virtual image 168 of a core location 170 that is displaced from the actual location of core 162. However, if the center of curvature is displaced to a location 175, the extraordinary ray will be imaged on the virtual image 177 of the core in the extraordinary ray. Thus, it is possible to couple either the ordinary component or the extraordinary component, but not both, by suitable location of the center curvature of the reflector.

Figure 9A:
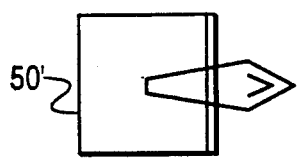
FIG. 9A is a plan view of a polarization independent polarizer for use with the present invention.
Figure 9B:
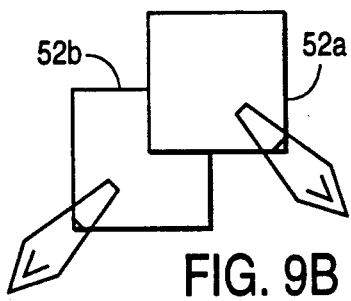
FIG. 9B is an exploded view of a polarization independent analyzer for use with the present invention.

FIGS. 9A and 9B illustrate a preferred embodiment of a polarizer 50' and an analyzer 52', configured to make the operation of any of the devices described above polarization independent. The polarizer, shown in FIG. 9A, is a calcite plate ground with its faces at an angle to the optic axis. The optic axis is illustrated as extending out of the plane of the drawing at an angle of approximately 42° to the plate normal, with the projection in the plane of the plate parallel to two the plate's edges. One edge of the polarizer crystal is beveled in order to facilitate proper orientation during assembly. The analyzer, which is shown in an exploded view in FIG. 9B, is a compound structure comprising first and second calcite plates 52a and 52b, each ground with its faces at the same 42° angle relative to the optic axis as in the polarizer. However, each of the analyzer plates has the optic axis projection in the plane of the plate along a diagonal. The two analyzer plates are rotated 90° relative to one another so that the projections of their respective optic axes are at 90° to each other, and at 45° to the projected optic axis of the polarizer plate. The corner of each of the analyzer plates is beveled in order to facilitate proper alignment during assembly. For reasons to be discussed below, the polarizer plate is approximately $\sqrt{2}$ times as thick as each of the analyzer plates.

Figure 9C:
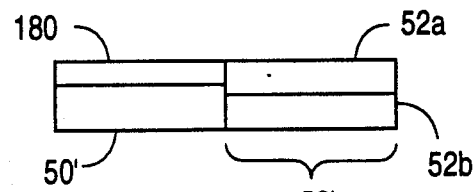
FIG. 9C is a cross sectional view of the polarizer and analyzer of FIGS. 9A and B.

FIG. 9C is a cross-sectional view of the polarizer and analyzer. In view of the fact that the thickness of the polarizer plate is less than the total thickness of the analyzer plates, a glass spacer 180 is provided so that the polarizer and analyzer have the same overall thickness.

Figure 9D:
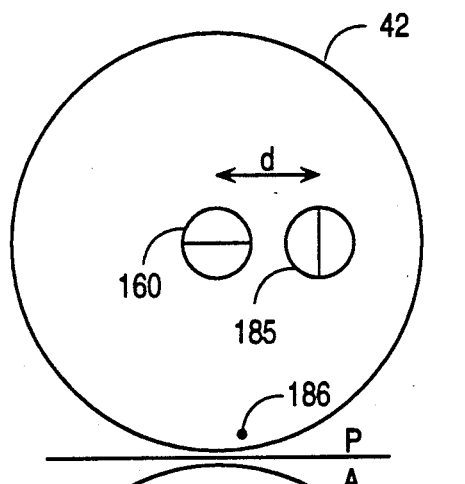
FIG. 9D shows schematically the polarization independent operation of the polarizer and analyzer of FIGS. 9A-B.
Figure 9D:
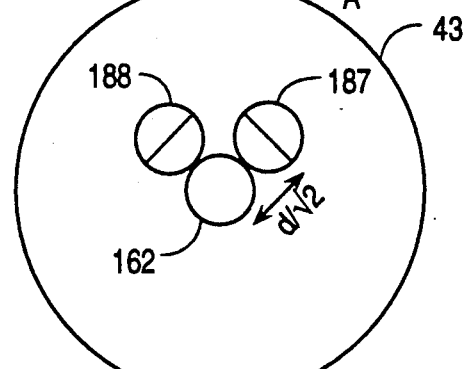

FIG. 9D illustrates the operation of polarizer 50' and analyzer 52' in a polarization independent device. Again, by way of example, input and output fibers 42 and 43 are shown with respective fiber cores 160 and 162. As in the polarization dependent case, the extraordinary ray appears to be emerging from a fiber core location 185 that is displaced by a distance d along the projection of the optic axis. In this case, polarization independent operation is achieved by locating the mirror center of curvature at a location 186 so that the ordinary and extraordinary rays are both apparently imaged at locations 187 and 188 displaced from fiber core 162 by equal distances $d/\sqrt{2}$ along the two optic axis projections. Each of the ordinary and extraordinary rays, upon entering the analyzer will be the ordinary ray in one of the plates and the extraordinary ray in the other plate. Therefore they undergo equal displacement along the optic axis toward the fiber core location.

The polarizer and analyzer do not provide an ideal polarization independent isolator because the optical path in the polarizer is different for the two input polarizations. Thus the focal points of the two output images do not lie in the same plane. This does not prove to be a serious problem, however, because the polarizer and analyzer must be kept thin to prevent overlap of the expanding light cones within the edge of the crystals. For a calcite polarizer, if the displacement d is 25μ, the difference in focal plane is approximately 22μ. If the difference is balanced between the two components, each will only be offset by 11μ from the ideal focus. For a near Gaussian intensity distribution near the focus, which is a good approximation for a single mode fiber, the added insertion loss for an 11μ longitudinal offset is only on the order of 0.05 db, which has a negligible impact on the overall loss of the device.

Conclusion

In conclusion, it can be seen that the present invention provides a configuration for fiber optic isolators and amplifiers that are compact and make optimum use of the expensive Faraday rotator material.

While the above is a full description of the preferred embodiments, various modifications, alternative constructions, and equivalents may be used. Therefore, the above description should not be taken as limiting the scope of the invention which is defined by the appended claims.

What is claimed is:

1. A fiber optic isolator comprising:
   a reflecting imaging device having a reflector;
   first and second ports, adapted to register the respective ends of first and second fibers at respective first and second optically conjugate locations;
   polarizer means located between said first port and said reflector, said polarizer means including a first birefringent plate;
   analyzer means located between said second port and said reflector, said analyzer means including a second birefringent plate;
   said first and second birefringent plates having projected optic axes at a relative angle of 45° to each other; and
   a 22.5° rotator disposed between said polarizer means and analyzer means on one side and said reflector on the other side;
   whereupon light entering said first port and passing through said polarizer means passes through said rotator, reflects from said reflector, passes again through said rotator, passes through said analyzer means, and leaves said second port, while light entering said second port and passing through said analyzer means passes through said rotator, reflects from said reflector, passes again through said rotator, and is prevented by said polarizer means from leaving said second port.

2. The isolator of claim 1 wherein said polarizer means and analyzer means operate to permit only one linear polarization component to pass through the isolator in one direction and to permit neither component to pass through in the other direction.

3. The isolator of claim 1 wherein said first and second birefringent plates are of equal thickness and are the only birefringent plates in said polarizer means and analyzer means.

4. The isolator of claim 1 wherein said polarizer means and analyzer means operate to permit both linear polarization components to pass through the isolator in one direction and to permit neither component to pass through in the other direction.

5. The isolator of claim 1 wherein:

said analyzer includes a third birefringent plate; and
said second and third birefringent plates are each $1\sqrt{2}$ as thick as said first birefringent plate.

6. The isolator of claim 1 wherein said reflecting imaging device comprises a concave reflector that provides substantially all the optical imaging power.

7. The isolator of claim 1 wherein said reflecting imaging device comprises a GRIN lens and a plane reflector, said GRIN lens providing substantially all the optical imaging power.

8. A fiber optic isolator comprising:
a reflecting imaging device having a reflector;
first, second, third, and fourth ports at respective first, second, third, and fourth locations;
said first and second ports being optically conjugate with respect to said reflecting imaging device, said third and fourth ports being optically conjugate with respect to said reflecting imaging device;
polarizer means located between said first and third ports on one side and said reflector on the other side;
analyzer means located between said second and fourth ports on one side and said reflector on the other side;
said polarizer means and analyzer means having axes at a relative angle of 45° to each other;
a 22.5° rotator disposed between said polarizer means and analyzer means on one side and said reflector on the other side; and
means for coupling light between said second and third ports;
whereupon light entering said first port and passing through said polarizer means passes through said rotator, reflects from said reflector, passes through said rotator and analyzer means to said second port, leaves said second port and is coupled into said third port, passes through said polarizer means and rotator, reflects from said reflector, passes through said rotator and analyzer means, and leaves said fourth port.

9. The isolator of claim 8 wherein said polarizer means and analyzer means operate to permit only one linear polarization component to pass through the isolator in one direction and to permit neither component to pass through in the other direction.

10. The isolator of claim 8 wherein said polarizer means and analyzer means operate to permit both linear polarization components to pass through the isolator in one direction and to permit neither component to pass through in the other direction.

11. The isolator of claim 8 wherein said reflecting imaging device comprises a concave reflector.

12. The isolator of claim 8 wherein said reflecting imaging device comprises a GRIN lens and a plane reflector.

13. A fiber optic device comprising:
a reflecting imaging device having a surface reflective to light at a given wavelength;
first, second, third, and fourth ports at respective first, second, third, and fourth locations;
said first and second ports being optically conjugate with respect to said reflecting imaging device, said third and fourth ports being optically conjugate with respect to said reflecting imaging device;
polarizer means located between said first and third ports on one side and said surface on the other side;
analyzer means located between said second and fourth ports on one side and said surface on the other side;
said polarizer means and analyzer means having axes at a relative angle of 45° to each other;
a 22.5° rotator disposed between said polarizer means and analyzer means on one side and said surface on the other side; and
means for coupling light between said second and third ports;
whereupon light entering said first port and passing through said polarizer means passes through said rotator, reflects from said surface, passes through said rotator and analyzer means to said second port, leaves said second port and is coupled into said third port, passes through said polarizer means and rotator, reflects from said surface, passes through said rotator and analyzer means, and leaves said fourth port.

14. The device of claim 13 wherein said reflecting imaging device comprises a concave reflector.

15. The device of claim 13 wherein said reflecting imaging device comprises a GRIN lens and a plane reflector.

16. The device of claim 13, and further comprising:
a second reflecting imaging device having a second surface reflective to light at a second wavelength, said second wavelength being shorter than said first-mentioned wavelength, at least one of said first-mentioned and second surfaces being transparent to light of the other wavelength;
a fifth port at a fifth location;
said second and fifth ports being optically conjugate with respect to said second reflecting imaging device; and
a fiber, doped over at least a portion of its length and having first and second ends registered at said second and third locations to define said coupling means;
whereupon light of said first-mentioned wavelength entering said first port and passing through said polarizer means passes through said rotator, reflects from said first-mentioned surface, passes through said rotator and analyzer means to said second port, leaves said second port and passes through said coupling means into said third port, passes through said polarizer means and rotator, reflects from said first-mentioned surface, passes through said rotator and analyzer means, and leaves said fourth port while light of said second wavelength entering said fifth port and passing through said polarizer means passes through said rotator, reflects from said second surface, passes through said rotator and analyzer means to said second port, and enters said doped fiber.

17. The device of claim 16 wherein said first-mentioned reflecting imaging device comprises a first concave reflector and said second reflecting imaging device comprises a second concave reflector.

18. The device of claim 16 wherein said first-mentioned reflecting imaging device comprises a GRIN lens and a first plane reflector and said second reflecting imaging device is defined by said GRIN lens and a second plane reflector.

19. The device of claim 16 wherein:
said first surface is transmissive to light of said first wavelength; and said first surface is between said rotator and said second surface.

20. The device of claim 13 wherein said polarizer means and analyzer means operate to permit only one linear polarization component to pass through the device in one direction and to permit neither component to pass through in the other direction.

21. The device of claim 13 wherein said polarizer means and analyzer means operate to permit linear polarization components to pass through the device in one direction and to permit neither component to pass through in the other direction.

22. A fiber optic isolated amplifier comprising:

means defining first and second concave surfaces reflective to light at respective first and second wavelengths, said second wavelength being shorter than said first wavelength, at least one of said surfaces being transparent to light of the other wavelength;

first, second, third, fourth, and fifth ports at respective first, second, third, fourth, and fifth locations;

said first and second ports being optically conjugate with respect to said first surface, said third and fourth ports being optically conjugate with respect to said first surface, and said second and fifth ports being optically conjugate with respect to said second surface;

polarizer means located between said first, third, and fifth ports on one side and said first surface on the other side;

analyzer means located between said second and fourth ports on one side and said first surface on the other side;

said polarizer means and analyzer means having axes at a relative angle of 45° to each other;

a 22.5° rotator disposed between said polarizer means and analyzer means on one side and said reflector on the other side; and a fiber, doped over at least a portion of its length and having first and second ends registered at said second and third locations;

whereupon light of said first wavelength entering said first port and passing through said polarizer means passes through said rotator, reflects from said first surface, passes through said rotator and analyzer means to said second port, leaves said second port and passes through said fiber into said third port, passes through said polarizer means and rotator, reflects from said first surface, passes through said rotator and analyzer means, and leaves said fourth port while light of said second wavelength entering said fifth port and passing through said polarizer means passes through said rotator, reflects from said second surface, passes through said rotator and analyzer means to said second port, and enters said fiber.

23. The amplifier of claim 22 wherein:

said first surface is transmissive to light of said first wavelength; and said first surface is between said rotator and said second surface.

24. The amplifier of claim 22 wherein said polarizer means and analyzer means operate to permit only one linear polarization component to pass through the amplifier in one direction and to permit neither component to pass through in the other direction.

25. The amplifier of claim 22 wherein said polarizer means and analyzer means operate to permit linear polarization components to pass through the amplifier in one direction and to permit neither component to pass through in the other direction.

* * * * *

UNITED STATES PATENT AND TRADEMARK OFFICE
CERTIFICATE OF CORRECTION

PATENT NO. : 5,191,467
DATED : March 2, 1993
INVENTOR(S) : Narinder S. Kapany, et. al.

It is certified that error appears in the above-indentified patent and that said Letters Patent is hereby corrected as shown below:

On the Title page, item [56], insert the following list of references:

U.S. PATENT DOCUMENTS

| Number | Date | Inventor | Class |
|---|---|---|---|
| 3,719,414 | 03/06/73 | Wentz | 350/150 |
| 4,178,073 | 12/11/79 | Uchida et al. | 350/151 |
| 4,461,543 | 07/24/84 | McMahon | 350/383 |
| 4,548,478 | 10/22/85 | Shirasaki | 350/377 |
| 4,656,433 | 04/07/87 | Franklin et al. | 330/4.4 |
| 4,712,880 | 12/15/87 | Shirasaki | 350/377 |
| 4,770,505 | 09/13/88 | Okazaki | 350/377 |
| 5,033,830 | 07/23/91 | Jameson | 350/385 |
| 5,028,104 | 07/02/91 | Kokoshvili | 350/96.15 |
| 4,329,017 | 05/11/82 | Kapany et al. | 350/96.15 |
| 4,479,697 | 10/30/84 | Kapany et al. | 350/96.18 |
| 4,741,588 | 05/03/88 | Nicia et al. | 350/96.19 |
| 4,859,014 | 08/22/89 | Schmitt et al. | 350/96.13 |
| 4,995,696 | 02/26/91 | Nishimura et al. | 350/96.2 |
| 5,042,039 | 08/20/91 | Edagawa et al. | 372/6 |

UNITED STATES PATENT AND TRADEMARK OFFICE
CERTIFICATE OF CORRECTION

PATENT NO. : 5,191,467
DATED : March 2, 1993
INVENTOR(S) : Narinder S. Kapany et al.

It is certified that error appears in the above—identified patent and that said Letters Patent is hereby corrected as shown below:

Title page, item [56], OTHER PUBLICATIONS

Takao Matsumoto, "Polarization-Independent Isolators for Fiber Optics", THE TRANSACTIONS OF THE IECE OF JAPAN, Vol. E 62, No. 7, Abstracts, pp. 516-517.

Kok Wai Chang et al., "Polarization Independent Isolator Using Spatial Walkoff Polarizers", IEEE PHOTONICS TECHNOLOGY LETTERS, Vol. 1, No. 3, March 1989, pp. 68-70.

Takao Matsumoto et al., "Polarization-Independent Optical Circulator: an Experiment", APPLIED OPTICS, Vol. 19, No. 1, January 1980, pp. 108-112.

M. Shirasaki et al., "Compact Polarization-Independent Optical Circulator", APPLIED OPTICS, Vol. 20, No. 15, August 1 1981, pp. 2683-2687.

Xuejin Yan et al., "Magneto-Optic Circulator for Optical Fiber Transmission", J. Appl. Phys., 65(4), February 15, 1989, pp. 1664-1665.

William L. Emkey, "A Polarization-Independent Optical Circulator for 1.3 $\mu$m", JOURNAL OF LIGHTWAVE TECHNOLOGY, Vol. LT-1, No. 3, September 1983, pp. 466-469.

Masataka Shirasaki et al., "Compact Optical Isolator for Fibers Using Birefringent Wedges", APPLIED OPTICS, Vol. 21, No. 23, December 1, 1982, pp. 4296-4299.

UNITED STATES PATENT AND TRADEMARK OFFICE
CERTIFICATE OF CORRECTION

PATENT NO. : 5,191,467
DATED : March 2, 1993
INVENTOR(S) : Narinder S. Kapany et al.

It is certified that error appears in the above—identified patent and that said Letters Patent is hereby corrected as shown below:

Narinder s. Kapany, "Centro-Symmetric Reflective Fiber-Optics Interface Devices", JOURNAL OF TECHNOLOGY, Vol. 1, November 1991, pp. 1-15

Signed and Sealed this

Twenty-sixth Day of April, 1994

Attest:

BRUCE LEHMAN

Attesting Officer

Commissioner of Patents and Trademarks